US011570736B2

(12) United States Patent
Kiilerich Pratas et al.

(10) Patent No.: US 11,570,736 B2
(45) Date of Patent: Jan. 31, 2023

(54) METHOD FOR DELAY SPREAD BASED TA VALIDATION

(71) Applicant: Nokia Technologies Oy, Espoo (FI)

(72) Inventors: Nuno Manuel Kiilerich Pratas, Gistrup (DK); Oana-Elena Barbu, Aalborg (DK); Daniela Laselva, Klarup (DK); Karri Markus Ranta-aho, Espoo (FI)

(73) Assignee: Nokia Technologies Oy, Espoo (FI)

( * ) Notice: Subject to any disclaimer, the term of this patent is extended or adjusted under 35 U.S.C. 154(b) by 30 days.

(21) Appl. No.: 17/149,064

(22) Filed: Jan. 14, 2021

(65) Prior Publication Data

US 2022/0225252 A1 Jul. 14, 2022

(51) Int. Cl.
*H04W 72/04* (2009.01)
*H04W 56/00* (2009.01)
*H04W 24/08* (2009.01)

(52) U.S. Cl.
CPC ......... *H04W 56/004* (2013.01); *H04W 24/08* (2013.01)

(58) Field of Classification Search
CPC .......................... H04W 56/004; H04W 24/08
See application file for complete search history.

(56) References Cited

U.S. PATENT DOCUMENTS

2020/0015263 A1* 1/2020 Huang ................. H04W 72/14
2020/0029326 A1* 1/2020 Wang ................ H04W 72/0446

OTHER PUBLICATIONS

Kim, Ha Yang, "Modeling And Tracking Time-Varying Clock Drifts In Wireless Networks", A Thesis Presented to The Academic Faulty of Georgia Institute of Technology, Aug. 2014, https.//smartech.gatech.edu/bitsteam/handle/1853/53988/KIM-DISSERTATION-2014.pdf.; 129 pages.

* cited by examiner

*Primary Examiner* — Jamal Javaid
(74) *Attorney, Agent, or Firm* — Harrington & Smith

(57) ABSTRACT

In order to perform small data transmission during an RRC_INACTIVE mode, a UE may need to determine whether the stored timing advance (TA) is valid. A TA may be valid if its usage would result in an uplink transmission arriving at a TRP of a base station during a time period during which the base station expects to receive uplink transmission. A UE may determine that a TA is valid based on a received fraction of the length of a cyclic prefix and observed SSB time shift.

24 Claims, 10 Drawing Sheets

900

| | |
|---|---|
| Determine a characteristic of a channel, wherein the channel is used for communication with a user equipment | 910 |
| ↓ | |
| Determine a fraction of a cyclic prefix length of a symbol for reception of an uplink transmission from the user equipment based, at least partially, on the determined characteristic of the channel | 920 |
| ↓ | |
| Transmit, to the user equipment, a downlink signal | 930 |
| ↓ | |
| Receive from the user equipment, a small data transmission based, at least partially, on the determined fraction of the length of the cyclic prefix and the transmitted downlink signal | 940 |

FIG. 9

METHOD FOR DELAY SPREAD BASED TA VALIDATION

BACKGROUND

Technical Field

The example and non-limiting embodiments relate generally to communications and, more particularly, to the use of a timing alignment in scheduling uplink transmission.

Brief Description of Prior Developments

It is known, for uplink transmission, to validate the timing advance based on the variation of reference signal received power between two time instances.

BRIEF DESCRIPTION OF THE DRAWINGS

The foregoing aspects and other features are explained in the following description, taken in connection with the accompanying drawings, wherein:

FIG. 9 is a flowchart illustrating steps as described herein.

DETAILED DESCRIPTION OF EMBODIMENTS

Figure 1:
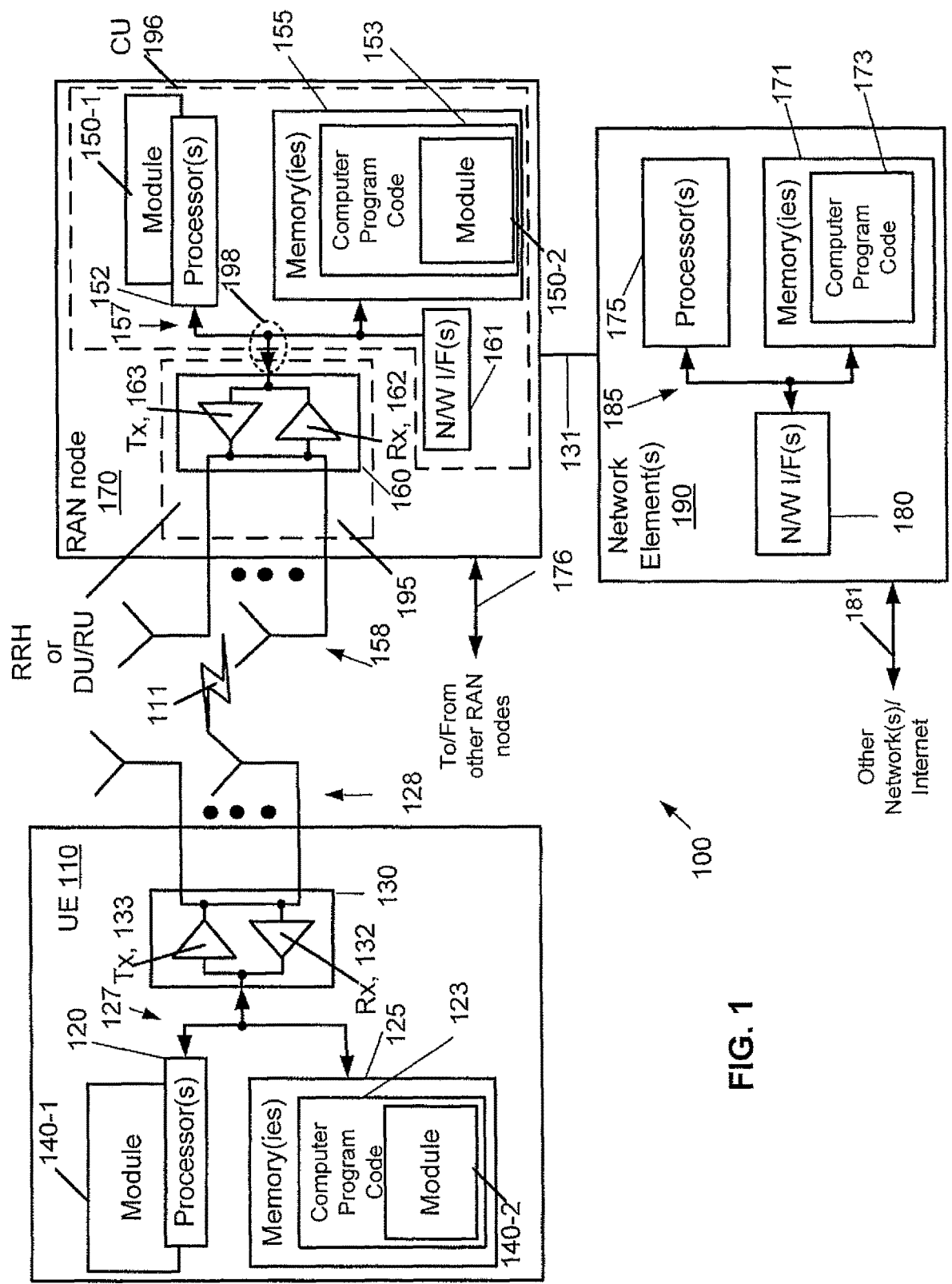
FIG. 1 is a block diagram of one possible and non-limiting exemplary system in which the exemplary embodiments may be practiced.

The following abbreviations that may be found in the specification and/or the drawing figures are defined as follows:
3GPP third generation partnership project
5G fifth generation
5GC 5G core network
AMF access and mobility management function
AS access stratum
CCCH common control channel
CG configured grant
CG-SDT configured grant-small data transfer
CP cyclic prefix
CQI channel quality indicator
CSI channel state information
CS-RNTI channel state information-radio network temporary identifier
CU central unit
DCI downlink control information
DL downlink
DMRS demodulation reference signal
DRX discontinuous reception
DU distributed unit
EDT early data transmission
eMBB enhanced mobile broadband
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDM frequency division multiplex
FR1 frequency range 1
FR2 frequency range 2
gNB (or gNodeB) base station for 5G/NR, i.e., a node providing NR user plane and control plane protocol terminations towards the UE, and connected via the NG interface to the 5 GC
GNSS global navigation satellite system
HO handover
I/F interface
IoT Internet of Things
I-RNTI inactive RNTI
L1 layer 1
LoS line-of-sight
LS least squares
LTE long term evolution
MAC medium access control
MCS modulation and coding scheme
MIoT mobile Internet of Things
MME mobility management entity
mMTC massive machine type communication
NB-IOT narrowband Internet of Things
ng or NG new generation
ng-eNB or NG-eNB new generation eNB
NLoS non-line-of-sight
NR new radio
N/W or NW network
OFDM orthogonal frequency division multiplex
PCG pre-configured grant
PDCCH physical downlink control channel
PDCP packet data convergence protocol
PDP power delay profile
PHY physical layer
PSS primary synchronization signal
PUR periodic uplink resources
PUSCH physical uplink shared channel
RA random access
RACH random access channel
RAN radio access network
RF radio frequency
RLC radio link control
RNAU RAN-based notification area update
RNTI radio network temporary identifier
RS reference signal
RSRP reference signal received power
RRH remote radio head
RRC radio resource control
RU radio unit
Rx receiver
SA system aspects
SA3 3GPP TSG SA WG3
SDAP service data adaptation protocol
SDT small data transmission
SGW serving gateway
SI system information
SIB system information block
SINR signal-to-interference plus noise ratio SMF session management function
SSB synchronization signal block
SSS secondary synchronization signal
SUL supplementary uplink
TA timing advance
TDM time division multiplex
TOA time of arrival
TRP transmission and reception point
Tx transmitter
UE user equipment (e.g., a wireless, typically mobile device)
UL uplink
UPF user plane function
URLLC ultra reliable low latency Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Features as described herein generally relate to enabling a UE in a radio resource control (RRC) inactive state to perform Small Data Transmission (SDT) over a pre-configured physical uplink shared channel (PUSCH) resource while the UE has a valid timing advance (TA).

In cellular systems, a TA may be used to compensate for the propagation delay difference(s) of UEs located at different distance(s) from a base station. In other words, the use of TA by UEs may allow for time alignment between uplink transmissions such that a base station receives all uplink transmissions during a same time period, even though the propagation delay associated with various UEs may differ. For example, when transmissions from UEs are time multiplexed, it may be important that the end of a transmission burst of a UE that is far from a base station does not overlap with the start of the transmission burst of a UE that is about to transmit and is located closer to the base station. Accordingly, the UE that is farther away may be asked by the network to 'advance' its uplink transmission in time relative to its observed downlink time, i.e. may receive/use a TA. In another example, for systems relying on/using orthogonal subcarriers and cyclic prefix (e.g. systems like LTE and NR), the frequency multiplexing of two uplink transmissions may need to be received with (almost) the same timing at a base station. Accordingly, similar to the TDM example above, a TA adjustment may be used to compensate for propagation delay differences. In both cases, transmissions made with an incorrect/invalid TA may cause problems for the receiving base station.

3GPP Rel-17 includes a work item entitled "NR small data transmissions in INACTIVE state" [RP-193252]. A motivation for this work item is to avoid the signaling overhead and delay associated with the transition of a UE from RRC_INACTIVE to RRC_CONNECTED states in order to perform a short data transmission (SDT), as the RRC_INACTIVE state was introduced in order to allow transition of UEs with infrequent data transmission to a state with minimum signaling overhead and power consumption. A stated objective of the work item is, for the RRC_INACTIVE state, transmission of UL data on pre-configured PUSCH resource(s) (i.e. reusing the configured grant type 1) when TA is valid.

Example embodiments of the present disclosure may relate to the configured grant (CG)-SDT mode for enabling SDT. In Rel-17, three different "modes" are supported for enabling SDT: 2-step RACH, "2-step RA SDT"—the MsgA PUSCH is used to transmit the SDT payload; 4-step RACH, "4-step RA SDT"—the Msg3 PUSCH is used to transmit the SDT payload; and transmission of UL data on pre-configured PUSCH resources, "CG-SDT"—Configured Grant-based resources of type 1 can be used by the UE to transmit the SDT payload when it has a valid TA. Example embodiments of the present disclosure may relate to the process of TA validation.

In 3GPP RAN2-111e the following agreements were made, related to SDT: Small data transmission with RRC message is supported as baseline for RA-based and CG based schemes; RRC-less can be studied for limited use cases (e.g. same serving cell and/or for CG) with lower priority; Context fetch and data forwarding with anchor re-location and without anchor re-location will be considered. FFS if there are problems with the scenario "without anchor relocation"; From RAN2 perspective, stored "configuration" in the UE Context is used for the RLC bearer configuration for any SDT mechanism (RACH and CG); The 2-step RACH or 4-step RACH should be applied to RACH based uplink small data transmission in RRC_INACTIVE; The uplink small data can be sent in MSGA of 2-step RACH or msg3 of 4-step RACH; Small data transmission is configured by the network on a per DRB basis; Data volume threshold is used for the UE to decide whether to do SOT or not. FFS how we calculate data volume. FFS if an "additional SDT specific" RSRP threshold is further used to determine whether the UE should do SOT; UL/DL transmission following UL SDT without transitioning to RRC_CONNECTED is supported; When UE is in RRC_INACTIVE, it should be possible to send multiple UL and DL packets as part of the same SDT mechanism and without transitioning to RRC_CONNECTED on dedicated grant. FFS on details and whether any indication to network is needed.

In 3GPP RAN2-112e, the following agreements were made, related to SOT: The configuration of configured grant resource for UE uplink small data transfer is contained in the RRCRelease message. FFS if other dedicated messages can configure CG in INACTIVE CG. Configuration is only type 1 CG with no contention resolution procedure for CG; The configuration of configured grant resource can include one type 1 CG configuration. FFS if multiple configured CGs are allowed; A new TA timer for TA maintenance specified for configured grant based small data transfer in RRC_INACTIVE should be introduced. FFS on the procedure, the validity of TA, and how to handle expiration of TA timer. The TA timer is configured together with the CG configuration in the RRCRelease message; The configuration of configured grant resource for UE small data transmission is valid only in the same serving cell. FFS for other CG validity criteria (e.g. timer, UL/SUL aspect, etc.); The UE can use configured grant based small data transfer if at least the following criteria is fulfilled (1) user data is smaller than the data volume threshold; (2) configured grant resource is configured and valid; (3) UE has valid TA. FFS for the candidate beam criteria; From RAN2 point of view: An association between CG resources and SSBs is required for CG-based SDT. FFS up to RAN1 how the association is configured or provided to the UE. Send an LS to RAN1 to start the discussion on how the association can be made. Mention that one option RAN2 considered was explicit configuration with RRC Release message; A SS-RSRP threshold is configured for SSB selection. UE selects one of the SSB with SS-RSRP above the threshold and selects the associated CG resource for UL data transmission.

Example embodiments of the present disclosure may relate to enabling SDT while a UE is in an RRC_INACTIVE state. The RRC_INACTIVE state was introduced in 3GPP NR Rel-15 to complement the existing states, RRC_CONNECTED and RRC_IDLE, with the goal of lean signaling and energy-efficient support of NR services. While the RRC_INACTIVE state was conceived particularly for massive machine type communication and/or mobile Internet of Things (mMTC/MIoT) services [see TR 22.824], it may be used to efficiently deliver small/infrequent traffic of enhanced mobile broadband (eMBB) and/or ultra-reliable low-latency (URLLC) services as well.

Figure 2:
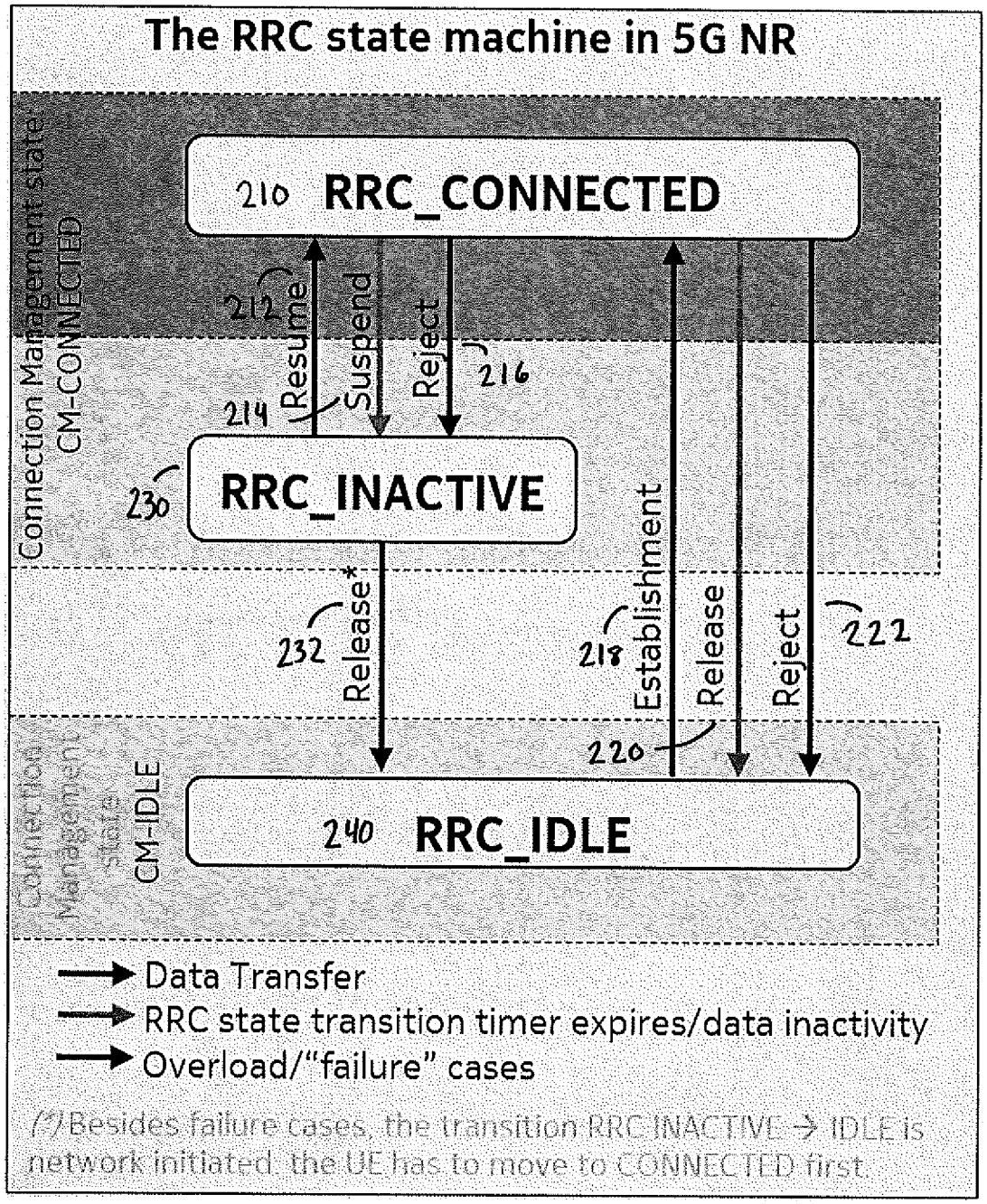
FIG. 2 is a diagram illustrating features as described herein.

Referring now to FIG. 2, illustrated is an example of the 5G NR RRC state machinery with RRC state transitions. The RRC_INACTIVE state, 230, may enable a UE to more quickly resume a connection, 212, and start transmission of small or sporadic data with a much lower initial access delay and associated signaling overhead, when compared to the RRC_IDLE state, 240. This may be due to the reduced control signaling required for requesting and obtaining the resumption of a suspended RRC connection, which may result in UE power saving.

A UE in RRC_INACTIVE state, 230, may be able to achieve similar power savings as in RRC_IDLE state, 240, by benefiting from, for example, a much larger period of physical downlink control channel (PDCCH) monitoring (e.g. paging) and relaxed measurements compared to the RRC_CONNECTED state, 210. Furthermore, compared to keeping the UE in RRC_CONNECTED state, 210, the new state (230) may minimize mobility signaling, both to the radio access network (RAN) (e.g. RRC measurement reporting, handover (HO) messages) and to the core network (e.g. to/from the access and mobility management function(s) (AMF)). When a UE is moved to RRC_INACTIVE state, 230, via an RRC Connection Suspend message, 214, the UE Access Stratum (AS) context (referred to as UE Inactive AS Context), which is necessary for the quick start of the connection, is maintained both at the UE side and RAN side, and it is identified by the UE identifier, i.e. Inactive-RNTI (I-RNTI).

The transition from RRC_CONNECTED state (210) to RRC_INACTIVE state (230) may be triggered by the gNB with the transmission of a RRCRelease message (e.g. 214), which may include suspend configuration information (such as I-RNTI, RAN-PagingCycle, RAN-NotificationAreaInfo, and/or timer t380, which refers to the timer that controls when the periodic RAN-based notification area update (RNAU) procedure should occur at the UE).

Referring now to FIG. 2, it may be noted that establishment, 218, of the RRC_CONNECTED state (210) and resumption, 212, of the RRC_CONNECTED state (210) from the RRC_INACTIVE state (230) may involve data transfer from the UE to the network. It may be noted that the release, 220, of a UE from RRC_CONNECTED state (210) to the RRC_IDLE state (240) and the suspension, 214, of the UE from RRC_CONNECTED state (210) to the RRC_INACTIVE state (230) may involve expiration of an RRC state transition timer and/or data inactivity. It may be noted that rejection, 216/222, causing transition from the RRC_CONNECTED state (210) to the RRC_INACTIVE state (230) or the RRC_IDLE state (240) may involve occurrence of an overload or failure case.

Figure 3A:
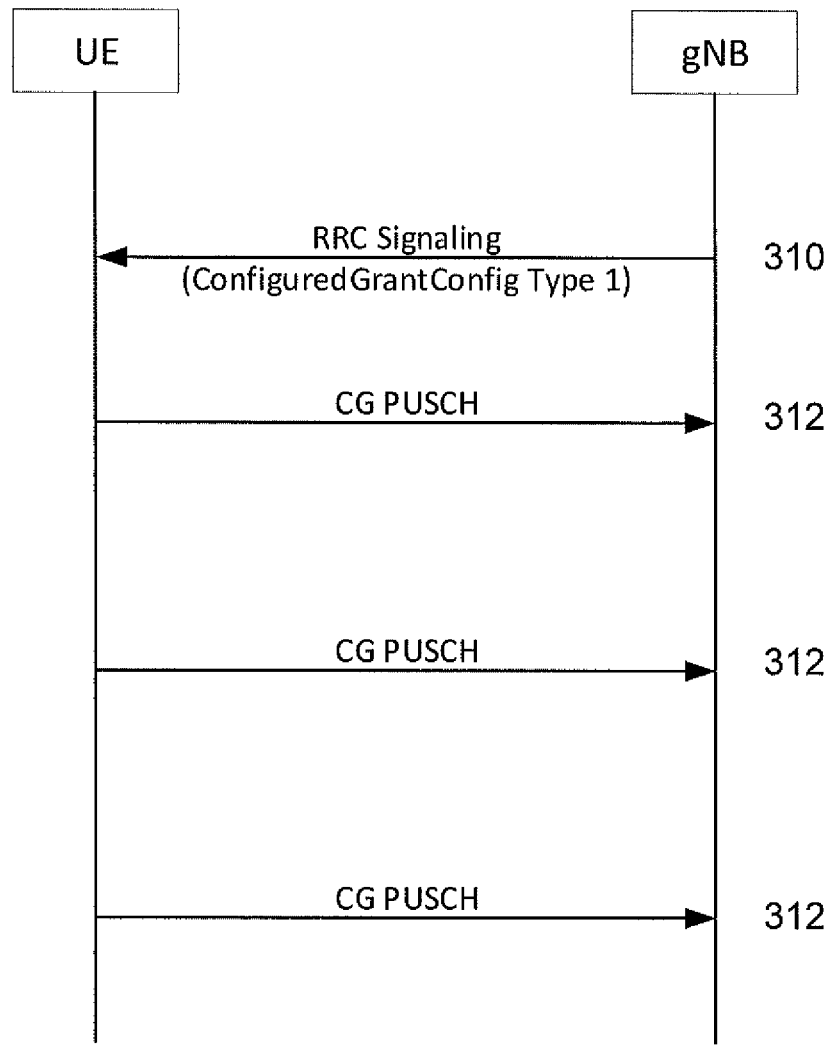
FIG. 3A is a flowchart illustrating features as described herein.
Figure 3B:
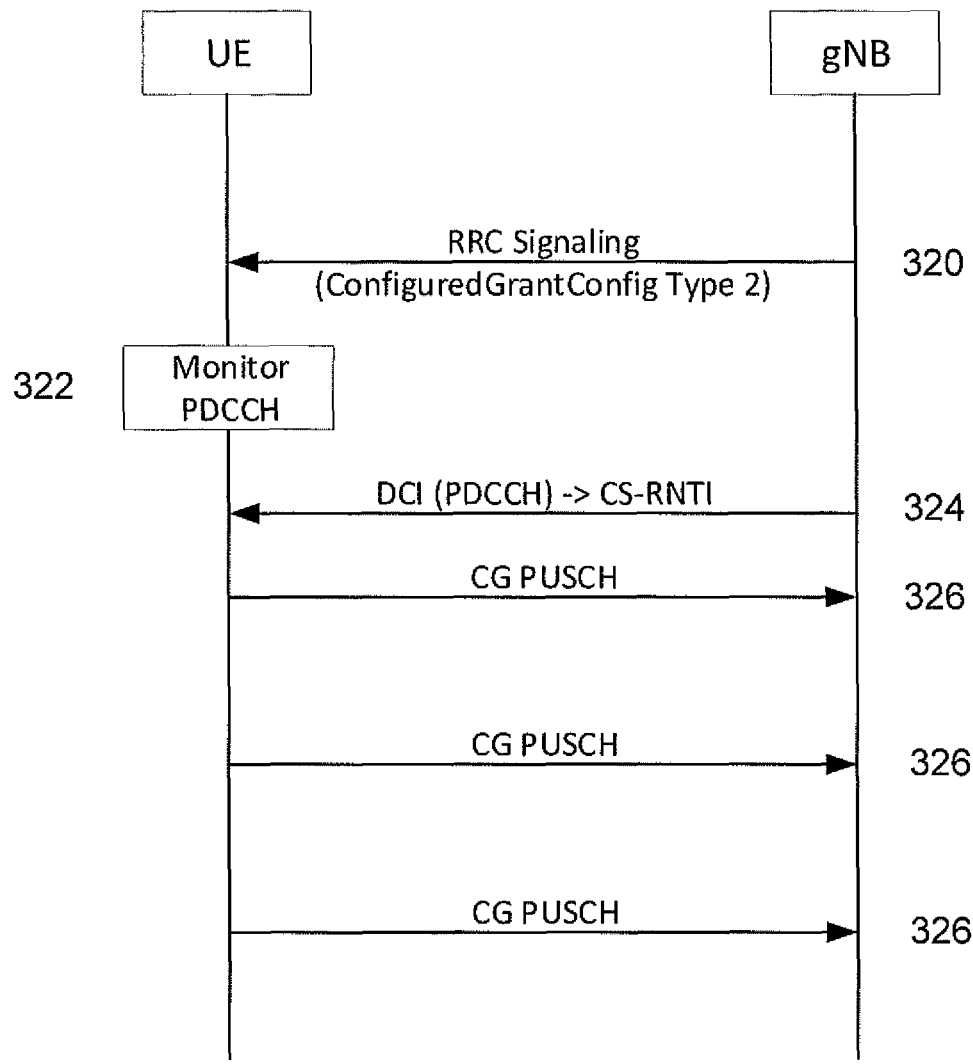
FIG. 3B is a flowchart illustrating features as described herein.
Figure 5:
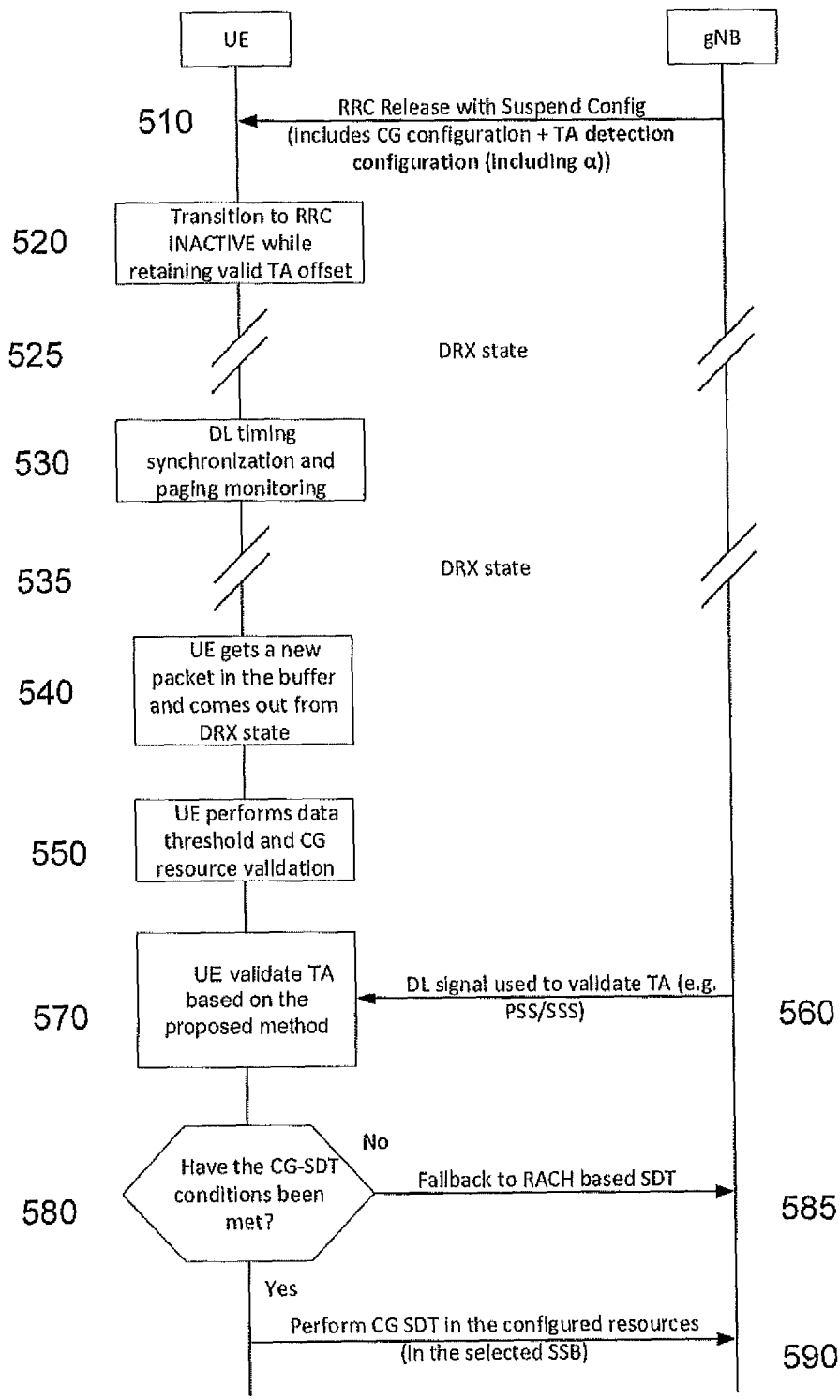
FIG. 5 is a flowchart illustrating features as described herein.

Referring now to FIGS. 3A and 3B, illustrated are examples of configured grant operation in NR. In NR, it may be possible to configure uplink transmissions without the need to transmit a dynamic grant corresponding to each UL transmission occasion. The configuration of these uplink resources, also referred to as Configure Grant (CG) PUSCH resources, may happen according to two possible schemes. The actual uplink grant may either be configured via RRC (type 1, see FIG. 3A) or provided via a combination of RRC and PDCCH (addressed to CS-RNTI) (type 2, see FIG. 3B) [38.331, ConfiguredGrantConfig], as depicted in FIG. 5.

Referring now to FIG. 3A, illustrated is an example of type 1 configured grant operation in NR. At 310, the gNB may transmit RRC signaling to the UE according to ConfiguredGrantConfig type 1. This signaling may include configuration of the CG PUSCH resources, including periodicity and starting time. At 312, the UE may transmit using the CG PUSCH resources configured according to the RRC signaling.

Referring now to FIG. 3B, illustrated is an example of type 2 configured grant operation in NR. In type 2, the CG PUSCH resources may be partly configured via RRC signaling, while the actual starting time may be triggered via PDCCH. At 320, the gNB may transmit RRC signaling to the UE according to ConfiguredGrantConfig type 1. At 322, the UE may monitor PDCCH. At 324, the gNB may transmit downlink control information (DCI) to the UE over PDCCH. This DCI may include a channel state information radio network temporary identifier (CS-RNTI). This DCI may be configured to signal the actual starting time for configuring the CG PUSCH resources. At 326, the UE may transmit using the CG PUSCH resources configured according to the RRC signaling and the DCI.

In example embodiments of the present disclosure, preconfigured configured grant (PCG) resources may be configured and transmitted while UE is in INACTIVE state. Such resources may be configured for the UE using dedicated signaling. However, enabling small data transmission (SDT) using such PCG resources, thus extending the usage of the UE's PCG-SDT, may require maintenance of a valid Time Alignment (TA). In RAN2-112e, as noted above, it was agreed that a new TA timer for TA maintenance, specified for configured grant (CG) based SDT in RRC_INACTIVE, should be introduced, and the TA timer should be configured together with the CG configuration in the RRCRelease message. However, the procedure for verifying the validity of TA, the criteria for TA validity, and how to handle expiration of TA timer were not defined. It was also agreed that the UE may use CG based SDT if at least the following criteria is fulfilled: (1) user data is smaller than the data volume threshold; (2) configured grant resource is configured and valid; (3) UE has valid TA. However, the candidate beam criteria was not defined. If TA validity is not established, a UE may not attempt CG based SDT transmission.

The non-expiration of the TA timer, by itself, is not a sufficient condition to validate the TA of a UE, as the configured timer duration does not reflect the UE's mobility conditions; therefore, the UE can become time misaligned before the TA timer expires due to UE mobility. It may also be noted that the UE may be still time aligned (i.e. the TA may be valid) even when/after the TA timer expires.

In the example of narrow band Internet of Things (NB-IOT) periodic uplink resources (PUR), TA validation may be based on reference signal received power (RSRP). More specifically, TA validation may be based on the difference between the RSRP value measured at the time a PUR transmission has to be made, and the RSRP value measured at the time the UE had a valid TA (i.e. reference RSRP). Whenever the observed RSRP variation is above/greater than the configured delta increase/decrease threshold(s), the UE may determine that it no longer has a valid TA, and therefore cannot use the PUR for uplink transmission.

In LTE, PUR-based EDT (Early Data Transmission) may allow one uplink transmission from RRC_IDLE using a preconfigured uplink resource (PUR) without performing the random access procedure. The TA validation criteria in PUR may depend on RSRP variation as specified in TS 36.331 clause 5.3.3.19, which includes time alignment timer and RSRP change threshold:

"A UE shall consider the timing alignment value for transmission using PUR to be valid when all of the following conditions are fulfilled:

if pur-TimeAlignmentTimer is configured: pur-TimeAlignmentTimer is running as confirmed by lower layers;

if pur-RSRP-ChangeThreshold is configured: since the last TA validation, the serving cell RSRP has not increased by more than rsrp-IncreaseThresh; and since the last TA validation, the serving cell RSRP has not decreased by more than rsrp-DecreaseThresh;"

Figure 4:
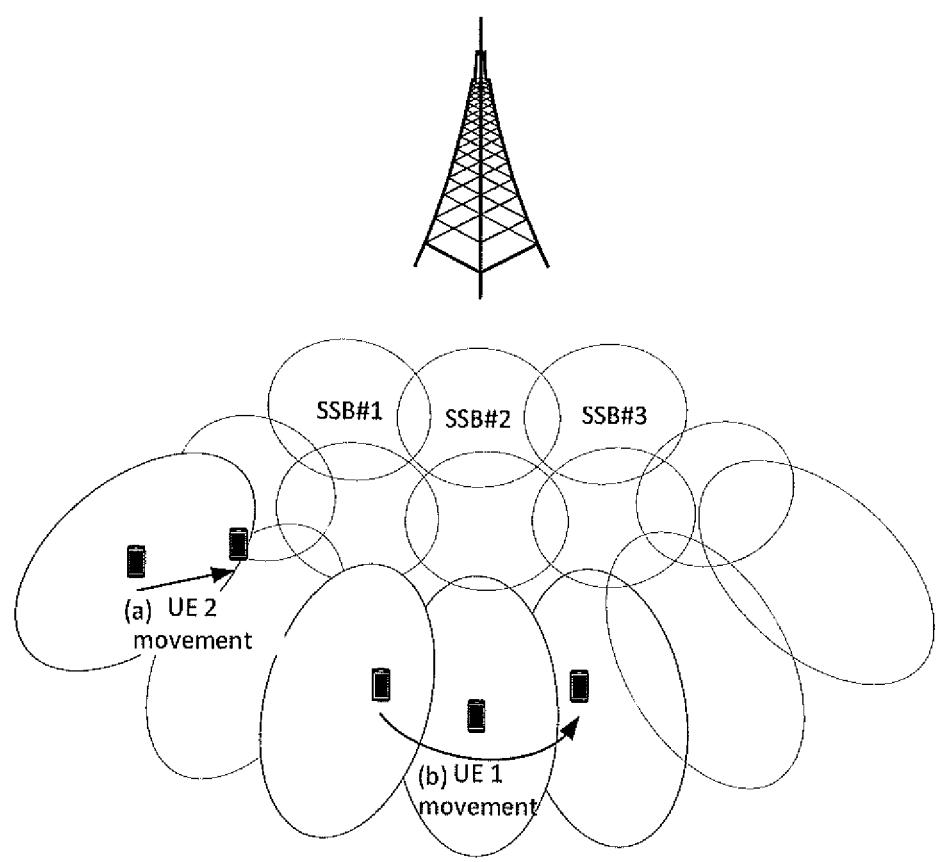
FIG. 4 is a diagram illustrating features as described herein.

In NR, this RSRP-based TA validation criteria might not be sufficient for determining TA validity due to characteristic(s) associated with the NR's beam-based operation. Referring now to FIG. 4, illustrated are two examples in which beamforming may disrupt measured RSRP, but in such a way that RSRP-based TA validation would not make it possible to ascertain if the UE still has a valid TA. In other words, in examples (a) and (b), it may not be possible for the UE to determine, based on the observation/measurement of RSRP, if the UE is still time aligned (i.e. has a valid TA).

The ellipsis of FIG. 4 may represent the synchronization signal block (SSB) coverage projected to the ground.

In example (a) of FIG. 4, UE2 moves within the same SSB beam (i.e. SSB #1) closer to the gNB (thereby reducing the pathloss), but farther away from the beamforming lobe (i.e. where the beamforming gain is the highest). This movement by UE2 may result in a net zero variation of the RSRP, but also in a beamforming gain decrease. Because the RSRP does not vary, the UE may not detect that the TA might no longer be valid (i.e. due to the beamforming gain decrease).

In example (b) of FIG. 4, UE1 moves between different SSB beams (i.e. SSB #1 to SSB #2 to SSB #3) while maintaining the same distance to the gNB, which may result in the UE observing a variation on the measured RSRP while still keeping a valid TA. Accordingly, the UE may determine that the TA is no longer valid, based on the observed RSRP, even when the TA is, in fact, valid (i.e. due to the maintained distance between the UE and the gNB, the uplink propagation delay might not have changed).

The examples of FIG. 4 are nonlimiting examples in which RSRP-based TA validity detection may not be suitable in a NR system due to the multi-beam scenarios. Example embodiments of the present disclosure may provide methods for more robust detection of the TA misalignment in NR for CG-based SDT.

Features as described herein generally relate to a network-controlled method that enables a UE, before performing its CG-SDT transmission, to determine whether its TA setting is still valid. In an example embodiment, a UE may be able to estimate if a TA is valid based on the synchronization signal block (SSB) time drift observed by the UE upon performing downlink synchronization with a serving cell/transmission and reception point (TRP). Example embodiments of the present disclosure may relate to UE validation of its TA by estimating if the UE's potential CG-SDT transmission would fall within a fraction of the orthogonal frequency division multiplex (OFDM) symbol's cyclic prefix upon reception in the serving cell/TRP. Example embodiments of the present disclosure may involve computation/determination/calculation of an SSB_time_shift representing the time shift in DL reference signals such as SSB (i.e. the timing difference between the time instant when an SSB was expected to be received (excluding the UE's clock drift) and the time instant at which the SSB was actually received).

In an example embodiment, a UE may inform the network of its capability to perform TA alignment validation according to example embodiments of the present disclosure. For example, an (advanced) UE may have the capability to perform detection of timing misalignment according to example embodiments of the present disclosure (i.e. based on the time shift value of the reception timing of the received downlink signal, such as synchronization signal, as further described below with reference to FIG. 6). In an example embodiment, such a UE may indicate to the network that it has this capability during RRC Connected mode as part of the RRC UE capabilities exchange.

In an example embodiment, the network may then indicate, as part of the CG-SDT configuration, whether the UE can or cannot perform TA validation based on the proposed metric. In other words, a gNB may indicate whether TA validation based on reception timing of a downlink signal is allowed when determining whether SDT may be performed.

Referring now to FIG. 5, illustrated is an example procedure for performing CG-SDT. The example procedure includes validation of the TA according to example embodiments of the present disclosure. At 510, the UE may receive from the gNB/network a CG-SDT resource configuration (e.g. as part of the RRCRelease message, such as at 214 of FIG. 2), which may also include a TA validation configuration. Additionally or alternatively, the CG configuration may include an indication of whether the UE may perform TA validation based on an example embodiment of the present disclosure. Such an indication may be in response to (prior) receipt at the network of an indication that the UE is capable of performing TA validation based on, for example, reception timing of a DL signal. The TA validation configuration may include a fraction ($\alpha$) of the length of the cyclic prefix. $\alpha$ may comprise a value less than one, as the value may reflect the fraction of the cyclic prefix that may typically be occupied by the UL PDP in the (serving) cell, based on network knowledge of the radio channel. $\alpha$ may be a network controlled parameter used in TA validation. In an example embodiment, the TA validation configuration may include a value for a or may include an indication of $\alpha$.

In an example embodiment, the TA validation configuration may also include a timer value, or an indication of a timer value, that may indicate to the UE how long the indicated TA is expected to be valid In an example embodiment, a mapping may be established between the UE's measured synchronization signal block (SSB) reference signal received power (RSRP) and the value of a to be used (e.g. if the serving SSB's RSRP is x dBm, then the value of a may be a fraction z<1). In an example embodiment, such a mapping between the serving SSB's RSRP and a may be tabulated in the specification of the UE, may be included in an SOT configuration broadcasted in the cell, may be included in the (UE-dedicated) TA configuration, or may be part of the 3GPP specifications. The UE-dedicated TA configuration itself may have UE implementation-specific default values or may be defined in the associated 3GPP specifications. In an alternative example embodiment, a may be related to a different measurement made/observed by the UE, including but not limited to modulation and coding scheme (MCS), channel quality indicator (CQI), channel state information (CSI), signal-to-interference plus noise ratio (SINR) levels, and/or the cell load observed by the UE.

Alternatively, a default value for a may be provided in the specification of the UE, and the TA validation configuration may provide an offset that may be applied by the UE to the default value(s) to derive the actual a to be used in TA validation.

In an alternative example embodiment, a may be indicated specifically to the UE in the TA validation configuration (i.e. a value for a may be included in the RRC Release message 510).

At 520, the UE may transition to the RRC_INACTIVE state and may retain its (valid) TA. The TA may have been acquired while the UE was in RRC_CONNECTED state, or as a result of a TA command transmitted during the RRC Release procedure (e.g. that concludes an SDT transaction). The UE may then enter a discontinuous reception (DRX) state, 525.

At 530, the UE may awaken from the DRX state and reacquire the DL timing synchronization periodically (e.g. as part of the monitoring of a paging occasion). After its activities have been completed, the UE may re-enter the DRX state, 535.

At 540, the UE may receive a SDT payload from its upper layers and may come out of the DRX state in order to attempt CG-SDT. In other words, the UE may receive a trigger for performing SDT.

At 550, the UE may verify/determine whether all conditions (besides having a valid TA setting) for CG-SDT transmission are valid. In an example embodiment, the UE may determine whether the SDT payload to be transmitted is above or below one or more data threshold(s) for SDT, may determine whether the configured grant resources are valid, etc.

It should be noted that the verification of these conditions (e.g. SDT data threshold comparison, CG resource validation, SSB validation, etc.) may occur before or after the TA validation (570) takes place. All of these conditions may need to be met before CG-SDT may be performed; if any of these conditions is not met, then the CG-SDT transmission may not occur.

In the example illustrated by FIG. 5, it is assumed that the one or more validity conditions (e.g. SDT data threshold comparison and CG resource validation) are determined to be valid. If one or more of the validity conditions are determined to not be valid, CG-SDT may not be performed; instead, the UE may fall back to RACH-based SDT, such as, for example, 2-step RA SDT or 4-step RA SDT.

At 560, the UE may receive a DL signal that may be used to validate TA. For example, the DL signal may comprise a primary synchronization signal (PSS) or a secondary synchronization signal (SSS). The UE may attempt to reacquire the DL timing synchronization from the received DL signal. At 570, the UE may attempt to validate the TA. In an example embodiment, based on SSB time drift observed while performing DL timing synchronization, the UE may determine whether the TA is valid. In an example embodiment, the UE may attempt to validate the TA according to the process illustrated at FIG. 6.

Figure 6:
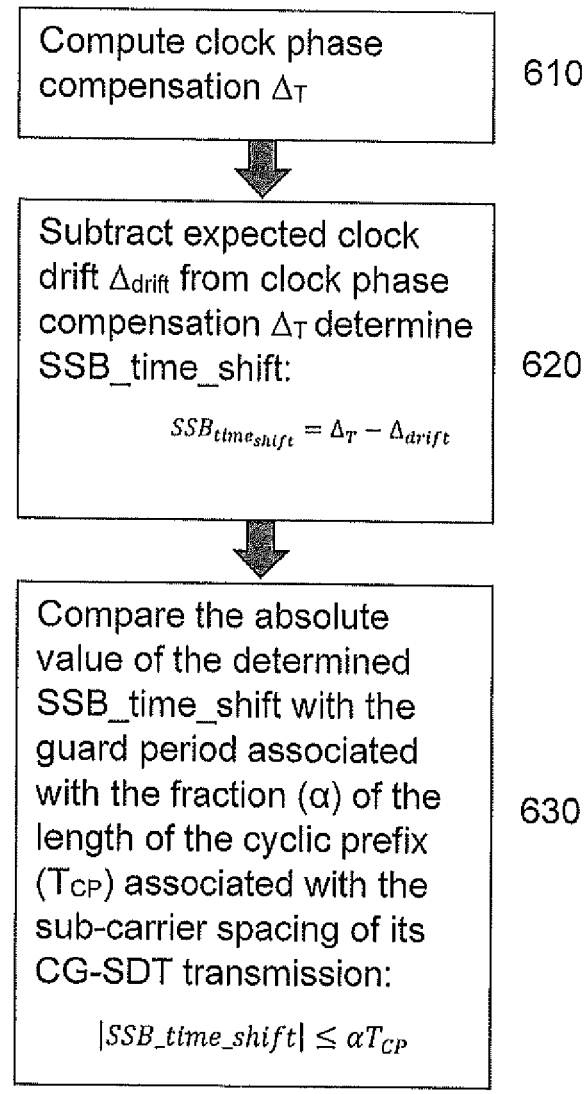
FIG. 6 is a flowchart illustrating features as described herein.

Referring now to FIG. 6, illustrated is an example process for a UE to determine whether its stored TA is valid and can be used for SDT according to an example embodiment of the present disclosure. In an example embodiment, the UE may determine whether the TA is valid by computing an SSB_time_shift and comparing the absolute value of the SSB_time_shift with a fraction of the cyclic prefix in which a serving TRP expects to receive uplink transmission. It should be noted that the steps of the illustrated example process may be performed in a different order, some steps may be performed simultaneously, and/or additional or different steps may be included.

At 610, upon receiving the serving SSB, the UE may compute the clock phase compensation ($\Delta_T$) required to realign its internal clock with the network. In other words, the UE may determine the correct time instant of the start of the DL slot, e.g. the DL signal received at 560.

A clock of the UE may consist of a periodic component (e.g. an oscillator) and a counting component (e.g. the hardware register where the current time is stored). The clock resolution, which corresponds to the smallest measurable time unit, may be determined via the combination of these two components. A clock drift may occur whenever the clock does not run at the correct speed compared to the actual time (e.g. the time used by the network).

Figure 7:
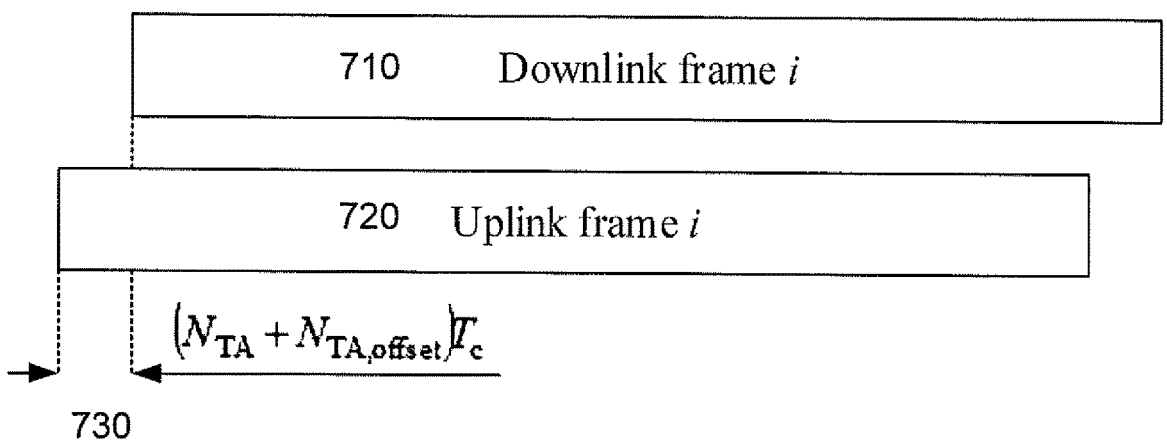
FIG. 7 is a diagram illustrating features as described herein.

During the DL synchronization procedure, the UE may apply a phase compensation ($\Delta_T$) to its internal clock which, in practice, may correspond to the total time offset applied to the UE clock in order to determine the correct time instant for the start of the DL slot. The UE's stored TA may be applied to the determined time instant of the DL slot in order to determine when the UE should start its UL transmission so that it will be received at the correct time at the serving cell/TRP, as depicted in FIG. 7. FIG. 7 illustrates an example in which uplink frame i, 720, must be transmitted with an offset, 730, relative the start of the DL slot, 710, that is based on the TA. This offset may be further described in 3GPP TS 38.211.

The phase compensation ($\Delta_T$) may be obtained either directly from the procedure that adjusts the clock (i.e. the UE clock management procedure) or by comparing the UE's clock before and after the phase compensation has taken place with another clock (e.g. the one associated with the UE's GNSS receiver). In the latter approach, this comparison may occur only prior to the CG-SDT resource validation, or at most every paging monitoring occasion (which for NR occurs, at most, every 2.56 seconds).

Referring now to FIG. 6, at 620, the UE may subtract, from the clock phase compensation ($\Delta_T$), the expected clock drift ($\Delta_{drift}$) since the last time the UE was DL time synchronized (e.g. the previous paging occasion) in order to obtain/compute/determine the SSB_time_shift in the DL reference signals (i.e. the difference between the time at which the UE expected to receive an SSB and the time at which the SSB was actually received):

$$SSB_{time_{shift}} = \Delta_T - \Delta_{drift}$$

The time at which the UE expected to receive a downlink signal (i.e. expected/estimated reception timing) may be determined based on an internal estimation of the UE, or may be received by the UE from an external source (e.g. GNSS).

The total applied phase compensation ($\Delta_T$) value may be the result of the UE's clock drift, the UE's movement, and/or any propagation changes (e.g. transition from LoS to NLoS towards the TRP). In an example embodiment, in order to extract from the applied phase compensation ($\Delta_T$) the contribution of the UE's movement and propagation changes, the expected clock drift ($\Delta_{drift}$) since the last time the UE's clock was DL synchronized (e.g. last paging occasion) may be applied to the clock phase compensation ($\Delta_T$). An example of a simple clock drift model is:

$$\Delta_{drift}(t_1) = \Delta_{drift}(t_0) + k(t_1 - t_0)$$

where $t_0$ may correspond to the last time that the UE was DL synchronized (e.g. in the previous paging monitoring occasion), while $t_1$ may correspond to the current time. In this example model, it may be assumed that the initial clock drift at to, $\Delta_{drift}(t_0)$, is known (or is even zero, since the UE's clock may be assumed to be DL synchronized); and that the clock drifts proportionally to k, the clock skew. More advanced models for the clock drift may be constructed/used that take into account the UE's clock imperfections (e.g. related to the quality of the oscillator) and outside factors (e.g. such as the power provided from the UE battery, temperature, pressure, humidity, age) during the monitoring period. In an example embodiment, the estimate of the start of the DL slot may be precise at most between paging occasion periods (i.e. currently up to 2.56 seconds).

Referring now to FIG. 6, at 630, the UE may compare the absolute value of the determined SSB_time_shift with the guard period associated with the fraction ($\alpha$) of the length of the cyclic prefix ($T_{CP}$) associated with the sub-carrier spacing of its CG-SDT transmission. The UE may then determine that it has a valid TA if the following TA validity condition is met:

$$|SSB\_time\_shift| \leq \alpha T_{CP}$$

Referring now to FIG. 5, if the TA validation condition is met at 580 (and any other CG-SDT conditions have also been met, e.g. at 550), the UE may proceed with the transmission of the CG-SDT in the configured CG resources (in the selected SSB) at 590. Optionally, the UE may only proceed with the transmission of the CG-SDT at 590 if the TA validation condition is met at 580. Optionally, the UE may not perform CG-SDT transmission at 590 unless the TA validation condition is met at 580. If the TA validation condition is not met at 580, the UE may fall back to RACH-based SDT at 585. RACH-based SDT may comprise, for example, 2-step RA SDT or 4-step RA SDT.

It should be noted that the steps of the example procedure for performing CG-SDT illustrated at FIG. 5 may be performed in a different order. Additionally or alternatively, one or more of the steps of FIG. 5 may be performed simultaneously. Additionally or alternatively, one or more of the steps of FIG. 5 may be unnecessary. For example, the UE may not undergo one or more of the DRX periods. Additionally or alternatively, additional steps may be included in the example procedure for performing CG-SDT illustrated at FIG. 5. For example, the UE may undergo one or more additional DRX periods. For example, the UE may perform measurements to determine RSRP, MCS, CQI, CSI, SINR, cell load, etc.

A technical effect of example embodiments of the present disclosure may be to allow a UE to detect the TA validity while removing/avoiding challenges associated with RSRP-based TA validity methods. A technical effect of example embodiments of the present disclosure may be that a determination of TA validity may be robust to beam changes, since the reference TOA value(s) may be computed on any beam. A technical effect of example embodiments of the present disclosure may be applicability to both FR1 and FR2.

Figure 8:
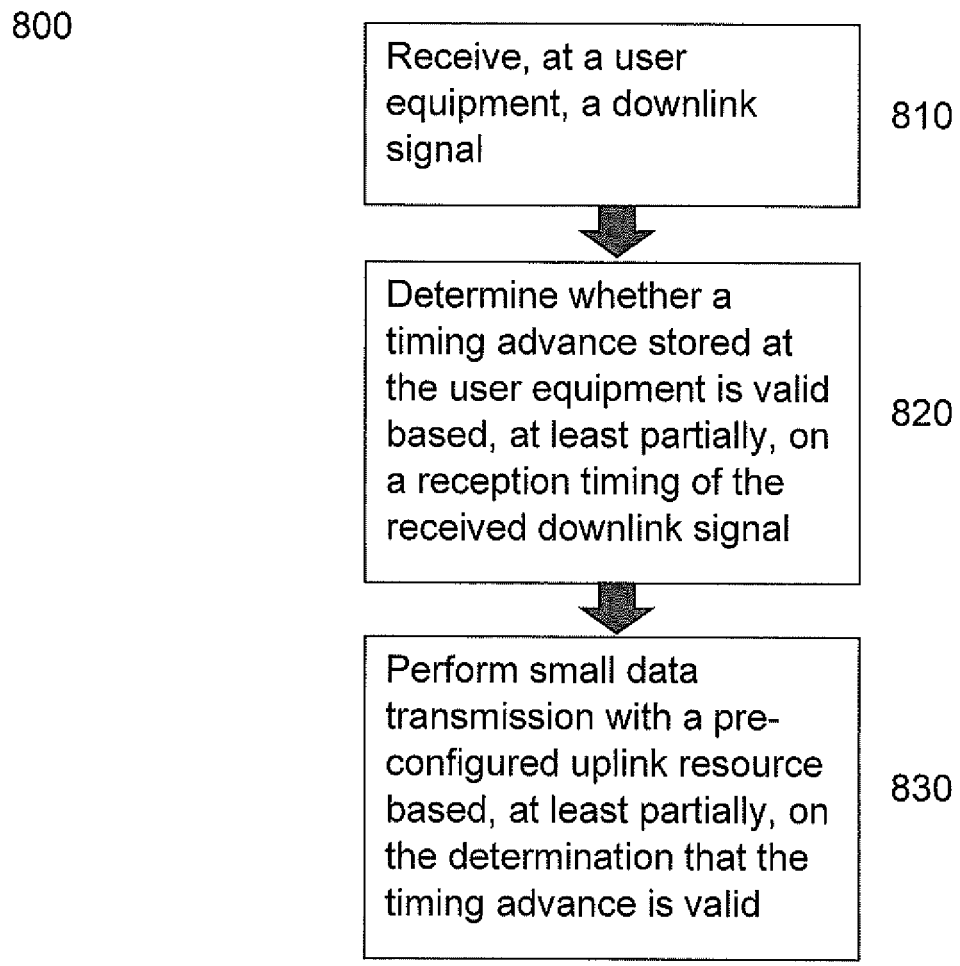
FIG. 8 is a flowchart illustrating features as described herein.

FIG. 8 illustrates the potential steps of an example method 800. The example method 800 may include: receiving, at a user equipment, a downlink signal, 810; determining whether a timing advance stored at the user equipment is valid based, at least partially, on a reception timing of the received downlink signal, 820; and performing small data transmission with a pre-configured uplink resource based, at least partially, on the determination that the timing advance is valid, 830.

FIG. 9 illustrates the potential steps of an example method 900. The example method 900 may include: determining a characteristic of a channel, wherein the channel is used for communication with a user equipment, 910; determining a fraction of a cyclic prefix length of a symbol for reception of an uplink transmission from the user equipment based, at least partially, on the determined characteristic of the channel, 920; transmitting, to the user equipment, a downlink signal, 930; and receiving, from the user equipment, a small data transmission based, at least partially, on the determined fraction of the length of the cyclic prefix and the transmitted downlink signal, 940.

In accordance with one aspect, an example method may be provided comprising: receiving, at a user equipment, a downlink signal; determining whether a timing advance stored at the user equipment is valid based, at least partially, on a reception timing of the received downlink signal; and performing small data transmission with a pre-configured uplink resource based, at least partially, on the determination that the timing advance is valid.

The determining of whether the timing advance stored at the user equipment is valid may be further based on a time shift value of the reception timing of the received downlink signal.

The determining of whether the timing advance stored at the user equipment is valid may further comprise: determining a clock phase compensation based on the received downlink signal; and subtracting an expected clock drift, from the determined clock phase compensation, to determine a time shift value, wherein the expected clock drift is based on a previous downlink synchronization of the user equipment.

The determining of whether the timing advance stored at the user equipment is valid may further comprise comparing the determined time shift value with a maximum time shift value.

The maximum time shift value may comprise one of: a fraction of the cyclic prefix length associated with a sub-carrier spacing of the pre-configured uplink resource, or the cyclic prefix length associated with a sub-carrier spacing of the pre-configured uplink resource.

The determining of whether the timing advance stored at the user equipment is valid may further comprise: comparing the determined time shift value with a guard period associated with a fraction of a length of a cyclic prefix associated with a sub-carrier spacing of the pre-configured uplink resource.

The timing advance may be determined to be valid where the determined time shift value is less than or equal to the guard period associated with the fraction of the length of the cyclic prefix associated with the sub-carrier spacing of the pre-configured uplink resource.

The example method may further comprise: determining the fraction of the cyclic prefix length associated with the sub-carrier spacing of the pre-configured uplink resource, wherein the determining of the fraction of the cyclic prefix length may comprise one of: receiving a configuration, wherein the configuration may comprise an indication of a value, wherein the determining of the fraction of the cyclic prefix length may comprise applying the indicated value to the cyclic prefix length associated with the sub-carrier spacing of the pre-configured uplink resource; or measuring, at the user equipment, at least one of: a reference signal received power of a synchronization signal block of the received downlink signal, a modulation and coding scheme, a channel quality indicator, a channel state information, a signal-to-interference plus noise ratio, or a cell load, wherein the determining of the fraction of the cyclic prefix length may be based, at least partially, on the measuring.

The example method may further comprise: determining whether the pre-configured uplink resource is valid; and determining whether data for the small data transmission has a size within a predetermined size range, wherein the performing of the small data transmission may be further based on: a determination that the pre-configured uplink resources is valid, and a determination that the size of the data is within the predetermined size range.

The example method may further comprise: transitioning the user equipment from a radio resource control connected state to a radio resource control inactive state, wherein the performing of the small data transmission may be performed while the user equipment is in the radio resource control inactive state.

The example method may further comprise: transmitting an indication that the user equipment is capable of determining whether the timing advance stored at the user equipment is valid based, at least partially, on the reception timing of the received downlink signal; and receiving a response to the indication, wherein the response may comprise an indication to perform validation of the timing advance according to the capability.

In accordance with one example embodiment, an apparatus may comprise: at least one processor; and at least one memory including computer program code; the at least one memory and the computer program code configured to, with the at least one processor, cause the apparatus to: receive a downlink signal; determine whether a timing advance stored at the apparatus is valid based, at least partially, on a reception timing of the received downlink signal; and perform small data transmission with a pre-configured uplink resource based, at least partially, on the determination that the timing advance is valid.

Determining whether the timing advance stored at the apparatus is valid may be further based on a time shift value of the reception timing of the received downlink signal.

Determining whether the timing advance stored at the apparatus is valid may further comprise the at least one memory and the computer program code are configured to, with the at least one processor, cause the apparatus to: determine a clock phase compensation based on the received downlink signal; and subtract an expected clock drift, from the determined clock phase compensation, to determine a time shift value, wherein the expected clock drift is based on a previous downlink synchronization of the apparatus.

Determining whether the timing advance stored at the apparatus is valid, may further comprise the at least one memory and the computer program code are configured to, with the at least one processor, cause the apparatus to compare the determined time shift value with a maximum time shift value.

The maximum time shift value may comprise one of: a fraction of the cyclic prefix length associated with a sub-carrier spacing of the pre-configured uplink resource, or the cyclic prefix length associated with a sub-carrier spacing of the pre-configured uplink resource.

The example apparatus may be further configured to: determine the fraction of the cyclic prefix length associated with the sub-carrier spacing of the pre-configured uplink resource, wherein determining the fraction of the cyclic prefix length may comprise one of: receiving a configuration, wherein the configuration may comprise an indication of a value, wherein the determining of the fraction of the cyclic prefix length may comprise applying the indicated value to the cyclic prefix length associated with the sub-carrier spacing of the pre-configured uplink resource; or measuring at least one of: a reference signal received power of a synchronization signal block of the received downlink signal, a modulation and coding scheme, a channel quality indicator, a channel state information, a signal-to-interference plus noise ratio, or a cell load, wherein the determining of the fraction of the cyclic prefix length is based, at least partially, on the measuring.

Determining whether the timing advance stored at the apparatus is valid may further comprise the at least one memory and the computer program code are configured to, with the at least one processor, cause the apparatus to: compare the determined time shift value with a guard period associated with a fraction of a length of a cyclic prefix associated with a sub-carrier spacing of the pre-configured uplink resource.

The example apparatus may be further configured to: transmit an indication that the apparatus is cable of determining whether the timing advance stored at the apparatus is valid based, at least partially, on the reception timing of the received downlink signal; and receive a response to the indication, wherein the response may comprise an indication to perform validation of the timing advance according to the capability.

In accordance with one example embodiment, an apparatus may comprise: circuitry configured to perform: receive a downlink signal; determine whether a timing advance stored at the apparatus is valid based, at least partially, on a reception timing of the received downlink signal; and perform small data transmission with a pre-configured uplink resource based, at least partially, on the determination that the timing advance is valid.

In accordance with one example embodiment, an apparatus may comprise: processing circuitry; memory circuitry including computer program code, the memory circuitry and the computer program code configured to, with the processing circuitry, enable the apparatus to: receive a downlink signal; determine whether a timing advance stored at the apparatus is valid based, at least partially, on a reception timing of the received downlink signal; and perform small data transmission with a pre-configured uplink resource based, at least partially, on the determination that the timing advance is valid.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: receiving a downlink signal; determining whether a timing advance stored at the apparatus is valid based, at least partially, on a reception timing of the received downlink signal; and performing small data transmission with a pre-configured uplink resource based, at least partially, on the determination that the timing advance is valid.

The determining of whether the timing advance stored at the apparatus is valid may be further based on a time shift value of the reception timing of the received downlink signal.

The means configured to perform determining whether the timing advance stored at the user equipment is valid may comprise means configured to perform: determining a clock phase compensation based on the received downlink signal; and subtracting an expected clock drift, from the determined clock phase compensation, to determine a time shift value, wherein the expected clock drift is based on a previous downlink synchronization of the apparatus.

The means configured to perform determining whether the timing advance stored at the user equipment is valid may comprise means configured to perform comparing the determined time shift value with a maximum time shift value.

The maximum time shift value may comprise one of: a fraction of the cyclic prefix length associated with a sub-carrier spacing of the pre-configured uplink resource, or the cyclic prefix length associated with a sub-carrier spacing of the pre-configured uplink resource.

The means may be further configured to perform: determining the fraction of the cyclic prefix length associated with the sub-carrier spacing of the pre-configured uplink resource, wherein the means configured to perform determining of the fraction of the cyclic prefix length may comprise means configured to perform one of: receiving a configuration, wherein the configuration comprises an indication of a value, wherein determining the fraction of the cyclic prefix length comprises applying the indicated value to the cyclic prefix length associated with the sub-carrier spacing of the pre-configured uplink resource; or measuring at least one of: a reference signal received power of a synchronization signal block of the received downlink signal, a modulation and coding scheme, a channel quality indicator, a channel state information, a signal-to-interference plus noise ratio, or a cell load, wherein the determining of the fraction of the cyclic prefix length is based, at least partially, on the measuring.

The means configured to perform determining of whether the timing advance stored at the user equipment is valid may comprise means configured to perform: comparing the determined time shift value with a guard period associated with a fraction of a length of a cyclic prefix associated with a sub-carrier spacing of the pre-configured uplink resource.

The means may be further configured to perform: transmitting an indication that the apparatus is capable of determining whether the timing advance stored at the apparatus is valid based, at least partially, on the reception timing of the received downlink signal; and receiving a response to the indication, wherein the response may comprise an indication to perform validation of the timing advance according to the capability.

In accordance with one example embodiment, a non-transitory computer-readable medium comprising program instructions stored thereon which, when executed with at least one processor, cause the at least one processor to: receive a downlink signal; determine whether a timing advance stored at a user equipment is valid based, at least partially, on a reception timing of the received downlink signal; and perform small data transmission with a pre-configured uplink resource based, at least partially, on the determination that the timing advance is valid.

Determining whether the timing advance stored at the user equipment is valid may be further based on a time shift value of the reception timing of the received downlink signal.

Determining whether the timing advance stored at the user equipment is valid may further comprise causing the at least one processor to: determine a clock phase compensation based on the received downlink signal; and subtract an expected clock drift, from the determined clock phase compensation, to determine a time shift value, wherein the expected clock drift is based on a previous downlink synchronization of the user equipment.

Determining whether the timing advance stored at the user equipment is valid may further comprise causing the at least one processor to compare the determined time shift value with a maximum time shift value.

The maximum time shift value may comprise one of: a fraction of the cyclic prefix length associated with a sub-carrier spacing of the pre-configured uplink resource, or the cyclic prefix length associated with a sub-carrier spacing of the pre-configured uplink resource.

The example non-transitory computer-readable medium may be further configured to: determine the fraction of the cyclic prefix length associated with the sub-carrier spacing of the pre-configured uplink resource, wherein determining the fraction of the cyclic prefix length may comprise one of: receiving a configuration, wherein the configuration may comprise an indication of a value, wherein the determining of the fraction of the cyclic prefix length may comprise applying the indicated value to the cyclic prefix length associated with the sub-carrier spacing of the pre-configured uplink resource; or measuring at least one of: a reference signal received power of a synchronization signal block of the received downlink signal, a modulation and coding scheme, a channel quality indicator, a channel state information, a signal-to-interference plus noise ratio, or a cell load, wherein the determining of the fraction of the cyclic prefix length is based, at least partially, on the measuring.

The example non-transitory computer-readable medium may be further configured to: transmit an indication that the user equipment is capable of determining whether the timing advance stored at the user equipment is valid based, at least partially, on the reception timing of the received downlink signal; and receive a response to the indication, wherein the response may comprise an indication to perform validation of the timing advance according to the capability.

In accordance with one aspect, an example method may be provided comprising: determining a characteristic of a channel, wherein the channel is used for communication with a user equipment; determining a fraction of a cyclic prefix length of a symbol for reception of an uplink transmission from the user equipment based, at least partially, on the determined characteristic of the channel; transmitting, to the user equipment, a downlink signal; and receiving, from the user equipment, a small data transmission based, at least partially, on the determined fraction of the length of the cyclic prefix and the transmitted downlink signal.

The example method may further comprise: transmitting, to the user equipment, an indication of the determined fraction of the cyclic prefix length.

The indication of the determined fraction of the cyclic prefix length may comprise an indication of an offset between the determined fraction of the cyclic prefix length and a default value.

The example method may further comprise: transmitting, to the user equipment, a timing advance; and transmitting, to the user equipment, a radio resource control message, wherein the radio resource control message may comprise a configuration, wherein the configuration may comprise at least one of: an indication of the determined fraction of the cyclic prefix length, or a maximum allowed time shift value.

The example method may further comprise: receiving, from the user equipment, an indication that the user equipment is capable of validating the timing advance according to a metric, wherein the metric is based, at least partially, on a reception timing of the downlink signal; and transmitting, to the user equipment, an indication to perform validation of the timing advance according to the metric.

In accordance with one example embodiment, an apparatus may comprise: at least one processor; and at least one memory including computer program code; the at least one memory and the computer program code configured to, with the at least one processor, cause the apparatus to: determine a characteristic of a channel, wherein the channel is used for communication with a user equipment; determine a fraction of a cyclic prefix length of a symbol for reception of an uplink transmission from the user equipment based, at least partially, on the determined characteristic of the channel; transmit, to the user equipment, a downlink signal; and receive, from the user equipment, a small data transmission based, at least partially, on the determined fraction of the length of the cyclic prefix and the transmitted downlink signal.

The example apparatus may be further configured to: transmit, to the user equipment, an indication of the determined fraction of the cyclic prefix length.

The indication of the determined fraction of the cyclic prefix length may comprise an indication of an offset between the determined fraction of the cyclic prefix length and a default value.

The example apparatus may be further configured to: transmit, to the user equipment, a timing advance; and transmit, to the user equipment, a radio resource control message, wherein the radio resource control message may comprise a configuration, wherein the configuration may comprise at least one of: an indication of the determined fraction of the cyclic prefix length, or a maximum allowed time shift value.

The example apparatus may be further configured to: receive, from the user equipment, an indication that the user equipment is capable of validating the timing advance according to a metric, wherein the metric is based, at least partially, on a reception timing of the downlink signal; and transmit, to the user equipment, an indication to perform validation of the timing advance according to the metric.

In accordance with one example embodiment, an apparatus may comprise: circuitry configured to perform: determine a characteristic of a channel, wherein the channel is used for communication with a user equipment; determine a fraction of a cyclic prefix length of a symbol for reception of an uplink transmission from the user equipment based, at least partially, on the determined characteristic of the channel; transmit, to the user equipment, a downlink signal; and receive, from the user equipment, a small data transmission based, at least partially, on the determined fraction of the length of the cyclic prefix and the transmitted downlink signal.

In accordance with one example embodiment, an apparatus may comprise: processing circuitry; memory circuitry including computer program code, the memory circuitry and the computer program code configured to, with the processing circuitry, enable the apparatus to: determine a characteristic of a channel, wherein the channel is used for communication with a user equipment; determine a fraction of a cyclic prefix length of a symbol for reception of an uplink transmission from the user equipment based, at least partially, on the determined characteristic of the channel; transmit, to the user equipment, a downlink signal; and receive, from the user equipment, a small data transmission based, at least partially, on the determined fraction of the length of the cyclic prefix and the transmitted downlink signal.

In accordance with one example embodiment, an apparatus may comprise means for performing: determining a characteristic of a channel, wherein the channel is used for communication with a user equipment; determining a fraction of a cyclic prefix length of a symbol for reception of an uplink transmission from the user equipment based, at least partially, on the determined characteristic of the channel; transmitting, to the user equipment, a downlink signal; and receiving, from the user equipment, a small data transmission based, at least partially, on the determined fraction of the length of the cyclic prefix and the transmitted downlink signal.

The means may be further configured to perform: transmitting, to the user equipment, an indication of the determined fraction of the cyclic prefix length.

The indication of the determined fraction of the cyclic prefix length may comprise an indication of an offset between the determined fraction of the cyclic prefix length and a default value.

The means may be further configured to perform: transmitting, to the user equipment, a timing advance; and transmitting, to the user equipment, a radio resource control message, wherein the radio resource control message may comprise a configuration, wherein the configuration may comprise at least one of: an indication of the determined fraction of the cyclic prefix length, or a maximum allowed time shift value.

The means may be further configured to perform: receiving, from the user equipment, an indication that the user equipment is capable of validating the timing advance according to a metric, wherein the metric is based, at least partially, on a reception timing of the downlink signal; and transmitting, to the user equipment, an indication to perform validation of the timing advance according to the metric.

In accordance with one example embodiment, a non-transitory computer-readable medium comprising program instructions stored thereon which, when executed with at least one processor, cause the at least one processor to: determine a characteristic of a channel, wherein the channel is used for communication with a user equipment; determine a fraction of a cyclic prefix length of a symbol for reception of an uplink transmission from the user equipment based, at least partially, on the determined characteristic of the channel; transmit, to the user equipment, a downlink signal; and receive, from the user equipment, a small data transmission based, at least partially, on the determined fraction of the length of the cyclic prefix and the transmitted downlink signal.

The example non-transitory computer-readable medium may be further configured to: transmit, to the user equipment, an indication of the determined fraction of the cyclic prefix length.

The indication of the determined fraction of the cyclic prefix length may comprise an indication of an offset between the determined fraction of the cyclic prefix length and a default value.

The example non-transitory computer-readable medium may be further configured to: transmit; to the user equipment, a timing advance; and transmit, to the user equipment, a radio resource control message, wherein the radio resource control message may comprise a configuration, wherein the configuration may comprise at least one of: an indication of the determined fraction of the cyclic prefix length, or a maximum allowed time shift value.

The example non-transitory computer-readable medium may be further configured to: receive, from the user equipment, an indication that the user equipment is capable of validating the timing advance according to a metric, wherein the metric is based, at least partially, on a reception timing of the downlink signal; and transmit, to the user equipment, an indication to perform validation of the timing advance according to the metric.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. A method comprising:
   receiving, at a user equipment, a downlink signal;
   determining whether a timing advance stored at the user equipment is valid based, at least partially, on a reception timing of the received downlink signal; and
   performing small data transmission with a pre-configured uplink resource based, at least partially, on the determination that the timing advance is valid.

2. The method of claim 1, wherein the determining of whether the timing advance stored at the user equipment is valid is further based on a time shift value of the reception timing of the received downlink signal.

3. The method of claim 1, wherein the determining of whether the timing advance stored at the user equipment is valid further comprises:
   determining a clock phase compensation based on the received downlink signal; and
   subtracting an expected clock drift, from the determined clock phase compensation, to determine a time shift value, wherein the expected clock drift is based on a previous downlink synchronization of the user equipment.

4. The method of claim 3, wherein the determining of whether the timing advance stored at the user equipment is valid further comprises comparing the determined time shift value with a maximum time shift value.

5. The method of claim 4, wherein the maximum time shift value comprises one of:
   a fraction of the cyclic prefix length associated with a sub-carrier spacing of the pre-configured uplink resource, or
   the cyclic prefix length associated with a sub-carrier spacing of the pre-configured uplink resource.

6. The method of claim 5, further comprising:
   determining the fraction of the cyclic prefix length associated with the sub-carrier spacing of the pre-configured uplink resource, wherein the determining of the fraction of the cyclic prefix length comprises one of:
receiving a configuration, wherein the configuration comprises an indication of a value, wherein the determining of the fraction of the cyclic prefix length comprises applying the indicated value to the cyclic prefix length associated with the sub-carrier spacing of the pre-configured uplink resource; or
measuring, at the user equipment, at least one of:
a reference signal received power of a synchronization signal block of the received downlink signal,
a modulation and coding scheme,
a channel quality indicator,
a channel state information,
a signal-to-interference plus noise ratio, or
a cell load observed,
wherein the determining of the fraction of the cyclic prefix length is based, at least partially, on the measuring.

7. The method of claim 3, wherein the determining of whether the timing advance stored at the user equipment is valid further comprises:
comparing the determined time shift value with a guard period associated with a fraction of a length of a cyclic prefix associated with a sub-carrier spacing of the pre-configured uplink resource.

8. The method of claim 1, further comprising:
transmitting an indication that the user equipment is capable of determining whether the timing advance stored at the user equipment is valid based, at least partially, on the reception timing of the received downlink signal; and
receiving a response to the indication, wherein the response comprises an indication to perform validation of the timing advance according to the capability.

9. An apparatus comprising:
at least one processor; and
at least one non-transitory memory and computer program code, wherein the at least one memory and the computer program code are configured to, with the at least one processor, cause the apparatus to:
receive a downlink signal;
determine whether a timing advance stored at the apparatus is valid based, at least partially, on a reception timing of the received downlink signal; and
perform small data transmission with a pre-configured uplink resource based, at least partially, on the determination that the timing advance is valid.

10. The apparatus of claim 9, wherein determining whether the timing advance stored at the apparatus is valid is further based on a time shift value of the reception timing of the received downlink signal.

11. The apparatus of claim 9, wherein determining whether the timing advance stored at the apparatus is valid further comprises the at least one memory and the computer program code are configured to, with the at least one processor, cause the apparatus to:
determine a clock phase compensation based on the received downlink signal; and
subtract an expected clock drift, from the determined clock phase compensation, to determine a time shift value, wherein the expected clock drift is based on a previous downlink synchronization of the apparatus.

12. The apparatus of claim 11, wherein determining whether the timing advance stored at the apparatus is valid further comprises the at least one memory and the computer program code are configured to, with the at least one processor, cause the apparatus to compare the determined time shift value with a maximum time shift value.

13. The apparatus of claim 12, wherein the maximum time shift value comprises one of:
a fraction of the cyclic prefix length associated with a sub-carrier spacing of the pre-configured uplink resource, or
the cyclic prefix length associated with a sub-carrier spacing of the pre-configured uplink resource.

14. The apparatus of claim 13, wherein the at least one memory and the computer program code are configured to, with the at least one processor, cause the apparatus to:
determine the fraction of the cyclic prefix length associated with the sub-carrier spacing of the pre-configured uplink resource, wherein determining the fraction of the cyclic prefix length comprises one of:
receiving a configuration, wherein the configuration comprises an indication of a value, wherein the determining of the fraction of the cyclic prefix length comprises applying the indicated value to the cyclic prefix length associated with the sub-carrier spacing of the pre-configured uplink resource; or
measuring at least one of:
a reference signal received power of a synchronization signal block of the received downlink signal,
a modulation and coding scheme,
a channel quality indicator,
a channel state information,
a signal-to-interference plus noise ratio, or
a cell load,
wherein the determining of the fraction of the cyclic prefix length is based, at least partially, on the measuring.

15. The apparatus of claim 11, wherein determining whether the timing advance stored at the apparatus is valid further comprises the at least one memory and the computer program code are configured to, with the at least one processor, cause the apparatus to:
compare the determined time shift value with a guard period associated with a fraction of a length of a cyclic prefix associated with a sub-carrier spacing of the pre-configured uplink resource.

16. The apparatus of claim 9, wherein the at least one memory and the computer program code are configured to, with the at least one processor, cause the apparatus to:
transmit an indication that the apparatus is capable of determining whether the timing advance stored at the apparatus is valid based, at least partially, on the reception timing of the received downlink signal; and
receive a response to the indication, wherein the response comprises an indication to perform validation of the timing advance according to the capability.

17. A non-transitory computer-readable medium comprising program instructions stored thereon which, when executed with at least one processor, cause the at least one processor to:
receive a downlink signal;
determine whether a timing advance stored at a user equipment is valid based, at least partially, on a reception timing of the received downlink signal; and
perform small data transmission with a pre-configured uplink resource based, at least partially, on the determination that the timing advance is valid.

18. The non-transitory computer-readable medium of claim 17, wherein determining whether the timing advance stored at the apparatus is valid is further based on a time shift value of the reception timing of the received downlink signal.

19. The non-transitory computer-readable medium of claim 17, wherein determining whether the timing advance stored at the apparatus is valid further comprises the program instructions stored thereon, when executed with the at least one processor, cause the at least one processor to:
determine a clock phase compensation based on the received downlink signal; and
subtract an expected clock drift, from the determined clock phase compensation, to determine a time shift value, wherein the expected clock drift is based on a previous downlink synchronization of the apparatus.

20. The non-transitory computer-readable medium of claim 19, wherein determining whether the timing advance stored at the apparatus is valid further comprises the program instructions stored thereon, when executed with the at least one processor, cause the at least one processor to compare the determined time shift value with a maximum time shift value.

21. The non-transitory computer-readable medium of claim 20, wherein the maximum time shift value comprises one of:
a fraction of the cyclic prefix length associated with a sub-carrier spacing of the pre-configured uplink resource, or
the cyclic prefix length associated with a sub-carrier spacing of the pre-configured uplink resource.

22. The non-transitory computer-readable medium of claim 21, wherein the program instructions stored thereon, when executed with the at least one processor, cause the at least one processor to:
determine the fraction of the cyclic prefix length associated with the sub-carrier spacing of the pre-configured uplink resource, wherein determining the fraction of the cyclic prefix length comprises one of:
causing receiving of a configuration, wherein the configuration comprises an indication of a value, wherein the determining of the fraction of the cyclic prefix length comprises applying the indicated value to the cyclic prefix length associated with the sub-carrier spacing of the pre-configured uplink resource; or
causing measuring of at least one of:
a reference signal received power of a synchronization signal block of the received downlink signal,
a modulation and coding scheme,
a channel quality indicator,
a channel state information,
a signal-to-interference plus noise ratio, or
a cell load,
wherein the determining of the fraction of the cyclic prefix length is based, at least partially, on the measuring.

23. The non-transitory computer-readable medium of claim 19, wherein determining whether the timing advance stored at the apparatus is valid further comprises the program instructions stored thereon, when executed with the at least one processor, cause the at least one processor to:
compare the determined time shift value with a guard period associated with a fraction of a length of a cyclic prefix associated with a sub-carrier spacing of the pre-configured uplink resource.

24. The apparatus of claim 17, wherein the program instructions stored thereon, when executed with the at least one processor, cause the at least one processor to:
cause transmitting of an indication that the apparatus is capable of determining whether the timing advance stored at the apparatus is valid based, at least partially, on the reception timing of the received downlink signal; and
cause receiving of a response to the indication, wherein the response comprises an indication to perform validation of the timing advance according to the capability.

* * * * *